United States Patent
Modi et al.

(10) Patent No.: US 6,587,866 B1
(45) Date of Patent: Jul. 1, 2003

(54) METHOD FOR DISTRIBUTING PACKETS TO SERVER NODES USING NETWORK CLIENT AFFINITY AND PACKET DISTRIBUTION TABLE

(75) Inventors: Sohrab Modi, Oakland, CA (US); Kevin Fox, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/480,280

(22) Filed: Jan. 10, 2000

(51) Int. Cl.[7] .......................... G06F 9/00; G06F 15/173
(52) U.S. Cl. .................... 709/105; 709/226; 709/240
(58) Field of Search ............................. 709/201, 203, 709/223, 224, 227, 241, 105

(56) References Cited

U.S. PATENT DOCUMENTS

| | | | |
|---|---|---|---|
| 5,774,660 A | 6/1998 | Brendel et al. | 395/200.31 |
| 5,918,017 A * | 6/1999 | Attanasio et al. | 709/224 |
| 5,938,732 A | 8/1999 | Lim et al. | 709/229 |
| 6,097,882 A * | 8/2000 | Mogul | 709/201 |
| 6,185,619 B1 * | 2/2001 | Joffe et al. | 709/223 |
| 6,195,680 B1 * | 2/2001 | Goldszmidt et al. | 709/203 |
| 6,247,141 B1 * | 6/2001 | Holmberg | 709/203 |
| 6,256,675 B1 * | 7/2001 | Rabinovich | 709/241 |
| 6,363,077 B1 * | 3/2002 | Wong et al. | |
| 6,424,992 B2 * | 7/2002 | Devarakonda et al. | 709/203 |
| 6,438,652 B1 * | 8/2002 | Jordan et al. | 709/105 |
| 6,470,389 B1 * | 10/2002 | Chung et al. | 709/227 |

FOREIGN PATENT DOCUMENTS

| | | | |
|---|---|---|---|
| EP | 0817444 A2 | 1/1998 | H04L/29/06 |
| EP | 0865180 A2 | 9/1998 | H04L/12/56 |
| WO | 98/26559 | 6/1998 | H04L/29/12 |
| WO | 98/25688 | 1/1999 | H04L/12/28 |

OTHER PUBLICATIONS

European Search Report, App. No. EP 01 30 0187, dated Apr. 19, 2001.
Guerney D.H. Hunt et al., "Network Dispatcher: a connection router for scalable Internet services", Computer Networks and ISDN Systems 30 (1998) 347–357.
German S. Goldzmidt et al., "Load Management for Scaling up Internet Services", 1998 IEEE 828–835.
Om P. Damani et al., "ONE–IP: techniques for hosting a service on a cluster of machines", Computer Networks and ISDN Systems 30 (1997) 1019–1027.

* cited by examiner

Primary Examiner—Le Hien Luu
Assistant Examiner—Quang N. Nguyen
(74) Attorney, Agent, or Firm—Beyer Weaver & Thomas, LLP

(57) ABSTRACT

A scalable cluster system that provides scalable services for client applications is provided with client affinity. The scalable services are transparent to the client application. To facilitate this transparent scalability, the system provides different types of client affinity to different services for the client applications. Services may have no client affinity, so that different packets sent during different connections could be sent to different nodes on the cluster. Services may have single service client affinity, which causes packets for a single service from different connections from the same source to be sent to the same node. Services may have multiple service client affinity, which causes packets for different services from different connections from the same source to be sent to the same node. Services may have wild card client affinity, which causes packets for different destination ports from different connections from the same source to be sent to the same node.

20 Claims, 8 Drawing Sheets

METHOD FOR DISTRIBUTING PACKETS TO SERVER NODES USING NETWORK CLIENT AFFINITY AND PACKET DISTRIBUTION TABLE

RELATED APPLICATIONS

The subject matter of this application is also related to the subject matter in a co-pending non-provisional application filed on the same day as the instant application by inventors Sohrab F. Modi, Sankar Ramamoorthi, Mani Mahalingam, Brian M. Oki, Hariprasad Mankude and Kevin C. Fox entitled "Method And Apparatus For Providing Scalable Services Using A Packet Distribution Table," having a Ser. No. 09/480,147; and filing date Jan. 10, 2000 still pending. The subject matter of this application is related to the subject matter in a co-pending non-provisional application filed on the same day as the instant application by inventors Brian M. Oki and Sohrab F. Modi entitled, "Method and Apparatus for Performing a Fast Service Lookup in Cluster Networking," having Ser. No. 09/480,146, and filing date Jan. 10, 2000. The subject matter of this application is also related to the subject matter in a co-pending non-provisional application filed on the same day as the instant application by inventors Hariprasad B. Mankude and Sohrab F. Modi entitled, "Method and Apparatus for Fast Packet Forwarding in Cluster Networking," having Ser. No. 09/480,145, and filing date Jan. 10, 2000. The subject matter of this application is also related to the subject matter in a co-pending non-provisional application filed on the same day as the instant application by inventors Hariprasad Mankude, Sohrab F. Modi, Sankar Ramamoorthi, Mani Mahalingam, and Kevin C. Fox entitled "Method For Creating Forwarding Lists For Cluster Networking," having a Ser. No. 09/480,788, and filing date Jan. 10, 2000.

BACKGROUND OF THE INVENTION

The present invention relates to clustered computer systems with multiple nodes that provide services in a scalable manner. More specifically, the present invention relates to a method and devices adapted to support client affinity in cluster computer systems.

The recent explosive growth of electronic commerce has led to a proliferation of web sites on the Internet selling products as diverse as toys, books, and automobiles, and providing services, such as insurance and stock trading. Millions of consumers are presently surfing through web sites in order to gather information, to make purchases, or to be entertained.

The increasing traffic on the Internet often places a tremendous load on the servers that host web sites. Some popular web sites receive over a million "hits" per day. In order to process this much traffic without subjecting web surfers to annoying delays in retrieving web pages, it is necessary to distribute the traffic between multiple server nodes, so that the multiple server nodes can operate in parallel to process the traffic.

In designing such a system to distribute traffic between multiple server nodes, a number of characteristics are desirable. It is desirable for such a system to be efficient in order to accommodate as much traffic as possible with a minimal amount of response time. It is desirable for such a system to be "scalable," so that additional server nodes can be added and balancing between the nodes can be modifiable to provide a service as demand for the service increases. In doing so, it is important to ensure that response time does not increase as additional server nodes are added. It is also desirable for such a system to be constantly available, even when individual server nodes or communication pathways between server nodes fail. It is desirable to provide a flexible system with different levels of client affinity.

A system that distributes traffic between multiple server nodes typically performs a number of tasks. Upon receiving a packet, the system performs a lookup to determine whether the service the packet is meant for is a scalable service.

Once the service is determined as a scalable service, the system distributes workload involved in providing the service between the server nodes that are able to provide the service. What is needed are a method and an apparatus for distributing workload between server nodes that is efficient, scalable and highly available, and allows client affinity.

Once a server node is selected, the packet is forwarded to the server node. The conventional technique of using a remote procedure call (RPC) or an interface definition language (IDL) call to forward a packet typically involves traversing an Internet Protocol (IP) stack from an RPC/IDL endpoint to a transport driver at the sender side, and then traversing another IP stack on the receiver side, from a transport driver to an RPC/IDL endpoint. Note that traversing these two IP stacks is highly inefficient. What is needed are a method and an apparatus for forwarding packets to server nodes that is efficient, scalable, and highly available.

It is desirable to have a scalable service that is transparent to an application. This transparency allows one to write an application that can run on a scalable service or a non-scalable service. Such an application is typically easier to write, since it does not need to take into account scalability. In addition, a scalable service that is transparent to the client application would tend to be able to use existing client applications. Scalable networks when running such applications may run the application on a node of the scalable service. If a series of connections are required between the server and client, one way of doing this is having the nodes in the scalable service have shared memory so that, if the client messages went to different nodes, any node on the system would be able to process the message by accessing the shared memory. The sharing of memory sometimes slows down the system and may be cumbersome. For these reasons, it would be desirable to have all of the packets from one client for one connection go to the same node in a scalable system (client affinity). It is also desirable to provide client affinity that is transparent to the client application.

Certain applications that use HTTP (HyperText Transfer Protocol) sometimes require a client affinity with the server. The HTTP protocol is basically stateless. However, certain higher level applications that use HTTP (a good example being servlets) maintain state between HTTP sessions (where an HTTP session would be a TCP connection). A normal HTTP page may require one or more connections and, as a general rule, the server would not keep any state when simply reading news or data. However, in the case of e-commerce, state could be maintained between TCP connections using client affinity. An example of this would be shopping at Amazon.com™, where a connection lets a user browse books and choose items to buy, while another connection is used to maintain the user's shopping basket through a mechanism of server session identifiers or cookies. In certain cases, multiple connections from the same client maintaining some affinity with a particular server would be helpful. In scalable services, the traffic coming to a particular shared IP address is distributed to any node of the cluster that is capable of satisfying the request. This distribution of the load is done on a per packet basis in the case of UDP and on a per connection basis in the case of TCP. Scalable services do not (and under normal circumstances should not) care as to what the application does with these requests. Such behavior could impair client affinity. Examples of services that are expected to have problems with a lack of client affinity are HTTP, secure HTTP, Java Servlets, FTP, passive mode FTP, and Real Audio®. It is desirable to provide different types of client affinity to scalable services, such as no affinity, client affinity, and wild card client affinity. It is desirable to provide different types of client affinity on a Solaris™ operating system, which provides clustering and scalable service.

Solaris™ is manufactured by Sun Microsystems™ of Palo Alto Calif.

SUMMARY OF THE INVENTION

One embodiment of the present invention provides a system that uses a packet distribution table to distribute packets to server nodes in a cluster of nodes that operate in concert to provide at least one service. The system operates by receiving a packet at an interface node in the cluster of nodes. This packet includes a source address specifying a location of a client from which the packet originated and a destination address specifying a service provided by the cluster of nodes. The system performs a function that maps the source address to an entry in a packet distribution table and retrieves an identifier specifying a server node from the entry in the packet distribution table. Next, the system forwards the packet to the server node specified by the identifier so that the server node can perform a service for the client. In this way, packets directed to a service specified by a single destination address are distributed across multiple server nodes in a manner specified by the packet distribution table. The invention provides different types of client affinity, so that the operator may define which services have the different types of client affinity.

Another embodiment of the present invention provides a method of distributing packets to server nodes in a cluster of nodes, comprising the steps of receiving a packet that is directed to a selected service supported by the cluster wherein the selected service can be provided by a plurality of nodes in the cluster. determining an appropriate server node based at least in part on whether the service designates client affinity, and passing the received packet to the appropriate server node.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), RAM (random access memory) and computer instruction signals embodied in a transmission medium (with or without a carrier wave upon which the signals are modulated). For example, the transmission medium may include a communications network, such as the Internet.

Clustered Computing System

Figure 1:
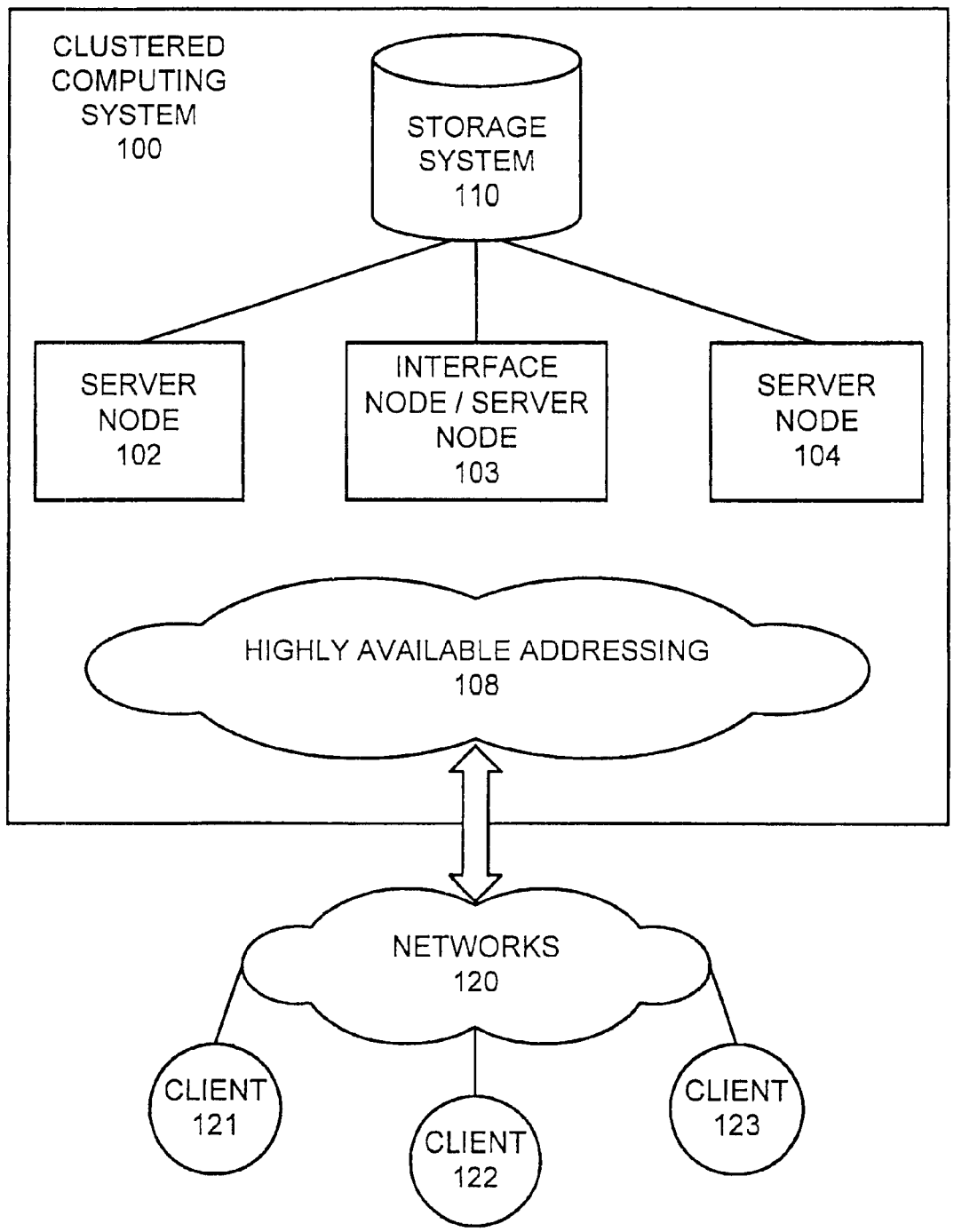
FIG. 1 illustrates a clustered computing system coupled to client computing systems through a network in accordance with an embodiment of the present invention.

FIG. 1 illustrates a clustered computing system 100 coupled to clients 121–123 through networks 120 in accordance with an embodiment of the present invention. Clients 121–123 can include any node on networks 120, including computational capability and including a mechanism for communicating across networks 120.

Clients 121–123 communicate with clustered computing system 100 by sending packets to clustered computing system 100 in order to request services from clustered computing system 100.

Networks 120 can include any type of wire or wireless communication channel capable of coupling together computing nodes. This includes, but is not limited to, a local area network, a wide area network, or a combination of networks.

In one embodiment of the present invention, networks 120 include the Internet.

Clustered computing system 100 includes a set of nodes that are coupled together through a communication channel (not shown). These nodes include server nodes 102 and 104 as well as interface node/server node 103. Nodes 102–104 are coupled to storage system 110. Storage system 110 provides archival storage for code and/or data that is manipulated by nodes 102–104. This archival storage may include, but is not limited to, magnetic storage, optical storage, flash memory, ROM, EPROM, EEPROM, and battery-backed-up RAM.

Nodes 102–104 are coupled together through a private interconnect with redundant pathways (not shown). For example, nodes 102–104 can be interconnected through a communication mechanism adhering to the Ethernet or a scalable coherent interconnect (SCI) standards. A path manager operates on all of the nodes in clustered computing system 100. This path manager knows about the interconnect topology and monitors the status of pathways. The path manager also provides an interface registry to which other components interested in the status of the interconnect can register. This provides a mechanism for the path manager to make callbacks to the interested components when the status of a path changes, if a new path comes up, or if a path is removed.

Nodes 102–104 are coupled to networks 120 through a highly available addressing system 108. Highly available addressing system 108 allows interface nodes within clustered computing system 100 to be addressed from networks 120 in a "highly-available" manner so that if an interface node fails, a backup secondary interface node is able to take its place without the failure being visible to clients 121–123. Note that interface node 103 can host one or more shared IP addresses for clustered computing system 100. Also note, that more than one node in clustered computing system 100 can act as a standby interface node for a given service. This allows a backup interface node to take over for an interface node that fails.

Note that nodes 102–104 within clustered computing system 100 can provide scalable services. Each scalable service behaves as a single logical entity from the view of clients 121–123. Also note that clients 121–123 can communicate with clustered computing system 100 through a transmission control protocol (TCP) connection or a user datagram protocol (UDP) session.

As load on a service increases, the service attempts to maintain the same per-client response time. A service is said to be "scalable" if increased load on the service is matched with an increase in hardware and server instances that are performing the service or by changing the balancing distribution between nodes. For example, a web server is scalable if additional load on the web server is matched by a corresponding increase in server nodes to process the additional load, or by a change in the distribution of the load across the hardware and server instances that are performing the service.

Clustered computing system 100 operates generally as follows. As packets arrive at interface node 103 from clients 121–123, a service is selected for the packet based on the destination address in the packet. Next, a server instance is selected for the packet based upon the source address of the packet as well as the destination address of the packet. Note that the system ensures that packets belonging to the same TCP connection are sent to the same server instance. Finally, the packet is sent to the selected server instance.

Internal Structure of Interface Nodes and Server Nodes

Figure 2:
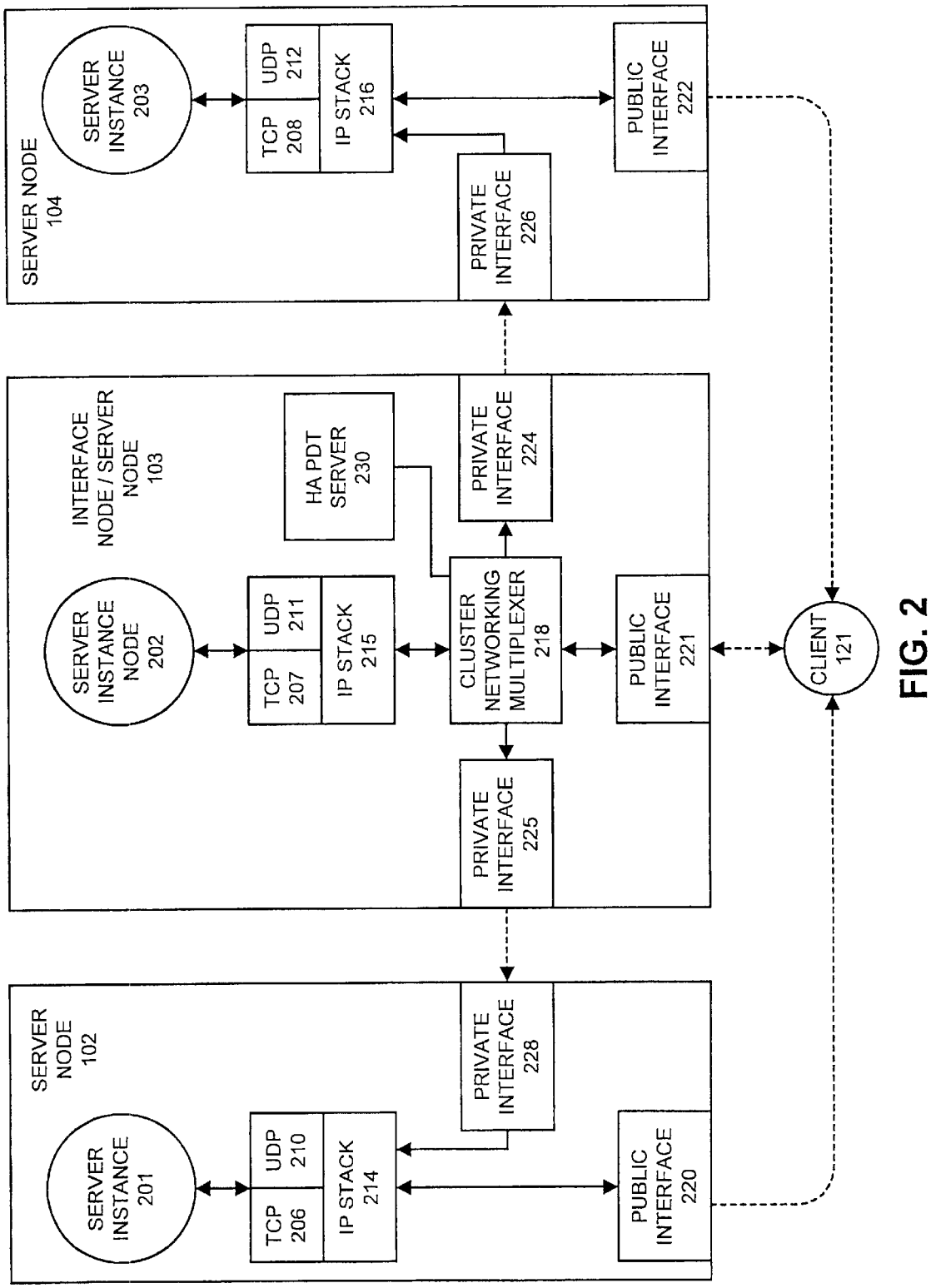
FIG. 2 illustrates the internal structure of an interface node and two server nodes within a clustered computing system in accordance with an embodiment of the present invention.

FIG. 2 illustrates the internal structure of interface node 103 and server nodes 102 and 104 within clustered computing system 100 (FIG. 1) in accordance with an embodiment of the present invention. Client 121 sends packets to clustered computing system 100 in order to receive a service from clustered computing system 100. These packets enter public interface 221 within interface node 103 in clustered computing system 100. Public interface 221 can include any type of interface that is able to receive packets from networks 120.

As packets arrive at interface node 103 via public interface 221, they pass through cluster networking multiplexer 218. Cluster networking multiplexer 218 forwards the packets to various nodes within clustered computing system 100 based upon load balancing policies and other considerations. In making forwarding decisions, cluster networking multiplexer 218 retrieves data from highly available PDT server 230. The structure of this data is described in more detail below with reference to FIG. 3. Note that HA PDT server 230 may be replicated across multiple nodes of clustered computing system 100 so that in case a node fails, a backup node can take over for it to maintain availability for HA PDT server 230.

Packets are forwarded from interface node 103 to other nodes in the clustered computing system 100, including server nodes 102 and 104, through private interfaces 224 and 225. Private interfaces 224 and 225 can include any interface that can handle communications between nodes within clustered computing system 100. For example, packets can be forwarded from private interface 224 to private interface 226 on server node 104, or from private interface 225 to private interface 228 on server node 102. Note that private interfaces 224 and 225 do not handle communications with entities outside of clustered computing system 100.

In some embodiments of the present invention, private interface 224 (and 225) and public interface 221 share some of the same communication hardware and send messages down some of the same physical data paths. In some of these embodiments, private interface 224 and public interface 221 may also share some of the same interface software. Hence, private interface 224 and public interface 221 need not represent different communication mechanisms. Therefore, the distinction between private interface 224 and public interface 221 can be merely a distinction between whether the communications are with an entity outside of clustered computing system 100, or with an entity within clustered computing system 100.

Packets entering server nodes 102 and 104 pass through IP stacks 214 and 216, respectively. Cluster networking multiplexer 218 can also send packets to IP stack 215 within interface node/server node 103, because node 103 is also able to act as a server. On server node 102, packets pass through IP stack 214 into TCP module 206, which supports TCP connections, or into UDP module 210, which supports UDP sessions. Similarly, on interface node/server node 103, packets pass through IP stack 215 into TCP module 207 or into UDP module 211. On server node 104, packets pass through IP stack 216 into TCP module 208 or into UDP module 212. Next, the packets are processed by server instances 201–203 on nodes 102–104, respectively.

Note that return communications for server nodes 102 and 104 do not follow the same path. Return communication from server node 102 pass down through IP stack 214, through public interface 220 and then to client 121. Similarly, return communications from server node 104 pass down through IP stack 216, through public interface 222 and then to client 121. This frees interface node 103 from having to handle return communication traffic.

In web server or other applications, this return communication mechanism can provide load balancing for the return traffic. Note that web servers typically receive navigational commands from a client, and in response send large volumes of web page content (such as graphical images) back to the client. For these applications, it is advantageous to distribute the return traffic over multiple return pathways to handle the large volume of return traffic.

Note that within a server node, such as a proxy node (a non-global interface node for that IP address), such as server node 104, shared IP addresses are hosted on the "loopback interface" of server node 104. (The loopback interface is defined within the UNIX and SOLARIS™ operating system standards. Solaris™ is a trademark of Sun Microsystems, Inc. of Palo Alto, Calif.).

Data Structures to Support Scalable Services

Figure 3:
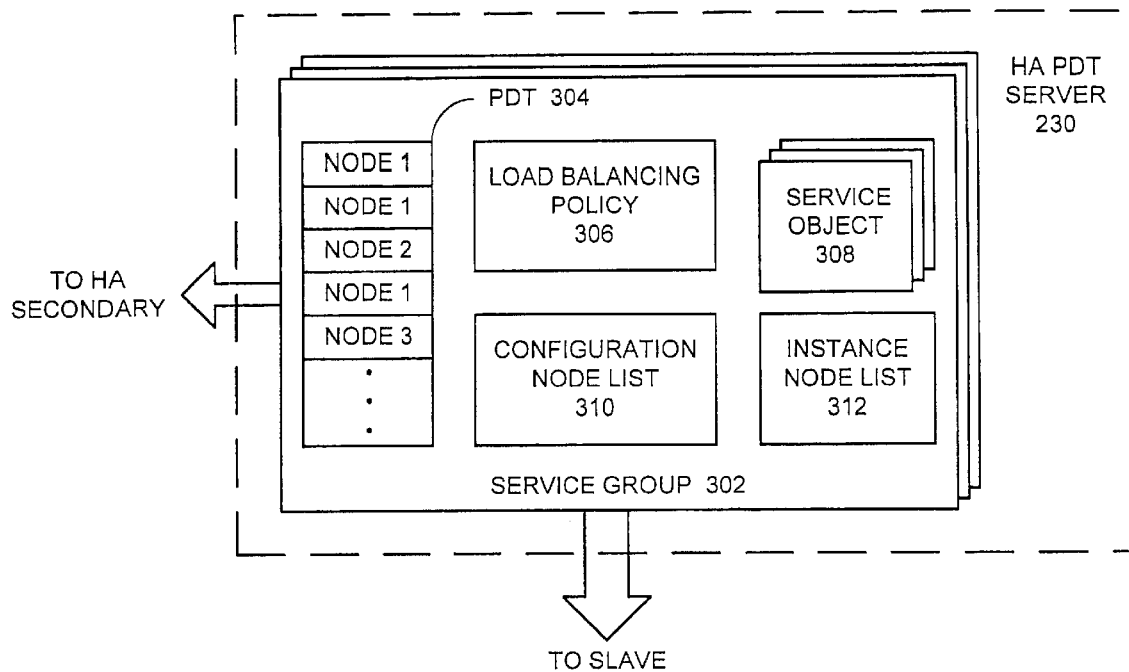
FIG. 3 illustrates data structures associated with a scalable service in accordance with an embodiment of the present invention.

FIG. 3 illustrates data structures associated with a scalable service in accordance with an embodiment of the present invention. HA PDT server 230 contains at least one service group 302. The service group 302 can be associated with a group of service objects (identified by a unique protocol, service IP address, and service port number combination) that share a load balancing policy.

Also note that service group 302 may have at least one associated secondary version on another node and possible spares for fault-tolerance purposes. Any changes to service group 302 may be checkpointed to this secondary version so that if the node containing the primary version of service group 302 fails, the node containing the secondary version can take over.

Service group 302 may be also associated with a number of "slave" versions of the service group located on other nodes in clustered computing system 100. This allows the other nodes to more quickly access the data within service group 302. Any changes to service group 302 may be propagated to the corresponding slave versions. Slave versions may be derivations of the master service group, not having all of the information in the master service group.

Service group 302 includes a number of data structures, including packet distribution table (PDT) 304, load balancing policy 306, a service object 308, configuration node list 310, and instance node list 312.

Configuration node list 310 contains a list of server nodes within clustered computing system 100 that can provide the services associated with service group 302. The service object 308 obtains configuration data from the configuration node list 310. Instance node list 312 contains a list of the nodes that are actually being used to provide these services. The service object 308 contains information related to a service (identified by a unique protocol, service IP address, and service port number combination) associated with the service group 302. There may be more than one service object in each service group. Each service (identified by a unique protocol, service IP address, and service port number combination) associated with the service group is associated with one service object (identified by the same unique protocol, service IP address, and service port number combination as the associated service) in the service group.

Load balancing policy 306 contains a description of a load balancing policy that is used to distribute packets between nodes involved in providing services associated with service group 302. The load balancing policy 306 may specify the load balancing policy type and load balancing policy weights. The described embodiment of the invention uses at least three types of load balancing policies, which include 1) a non-affinity policy, 2) a client affinity policy, and 3) a wild card client affinity policy. There may be various types of non-affinity policies, such as a weighted or round robin load balancing policy. The weights may specify that a certain percentage of traffic is sent to a certain node.

PDT 304 is used to implement the load balancing policy. PDT 304 includes entries that are populated with identifiers for nodes that are presently able to receive packets for the services associated with service group 302. In order to select a server node to forward a packet to, the system hashes the client address and potentially the client port according to the load balancing policy of the PDT 304 as described in more detail below. This hashing selects a particular entry in PDT 304, and this entry identifies a server node within clustered computing system 100.

Note that any random or pseudo-random function can be used to hash the source address.

Also note that the frequency of entries can be varied to achieve different distributions of traffic between different server nodes. For example, a high performance server node that is able to process a large amount of traffic can be given more entries in PDT 304 than a slower server node that is able to process less traffic. In this way, the high-performance server node will, on average, receive more traffic than the slower server node.

Figure 9:
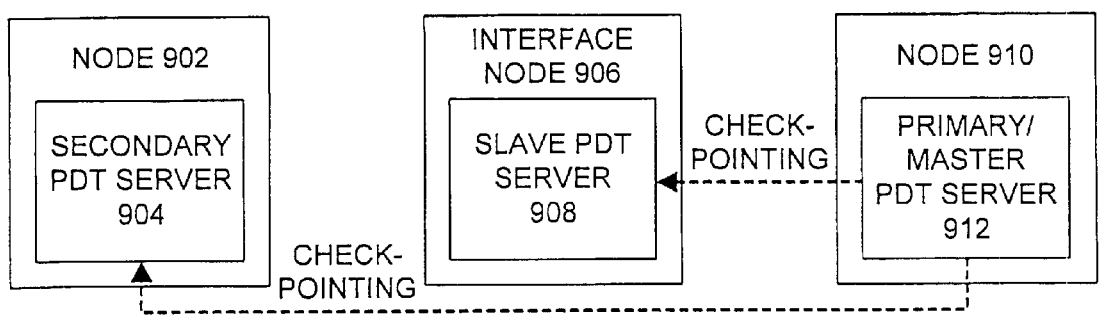
FIG. 9 illustrates how a PDT server is checkpointed to a slave PDT server and a secondary PDT server in accordance with an embodiment of the present invention.

Also note that, if a PDT server fails with configuration data present in its local memory, then a secondary PDT server will take over. The checkpointing process ensures that the configuration data will also be present in the local memory for the secondary PDT server. More specifically, FIG. 9 illustrates how a PDT server is checkpointed to a slave PDT server and a secondary PDT server in accordance with an embodiment of the present invention. As illustrated in FIG. 9, the system maintains a primary/master PDT server 912 on node 910. For high availability purposes, the state of primary/master PDT server 912 is checkpointed to secondary PDT server 904 on node 902 so that secondary PDT server 904 is kept consistent with primary/master PDT server 912. In this way, if primary/master PDT server 912 fails, secondary PDT server 904 is able to take its place.

If primary/master PDT server 912 is not located on an interface node 906, a slave PDT server 908 is maintained on interface node 906 for performance reasons (not high availability reasons). In this case, most of the state of primary/master PDT server 912 is checkpointed to slave PDT server 908 in interface node 906. This allows interface node 906 to access the information related to packet forwarding locally, within slave PDT server 908, without having to communicate with node primary/master PDT server 912 on node 910.

Master service groups are maintained in the primary/master PDT server 912, where the master service groups have master service objects. Secondary copies of the master service groups and master service objects are maintained in the secondary PDT server 904. Slave copies of the master service group, which are subsets or derivations of the master service group, and slave copies of the master service objects, which are subsets or derivations of the master service objects, are maintained in the slave PDT server 908. In the specification, when it is disclosed that data is being read from a service group or written to a service group, it may actually be written to a master, a secondary copy, or slave copy of the master service group. In addition, when it is disclosed that data is being read from a service object or written to a service object, it may actually be written to a master, a secondary copy, or slave copy of the master service object.

Packet Forwarding

Figure 4:
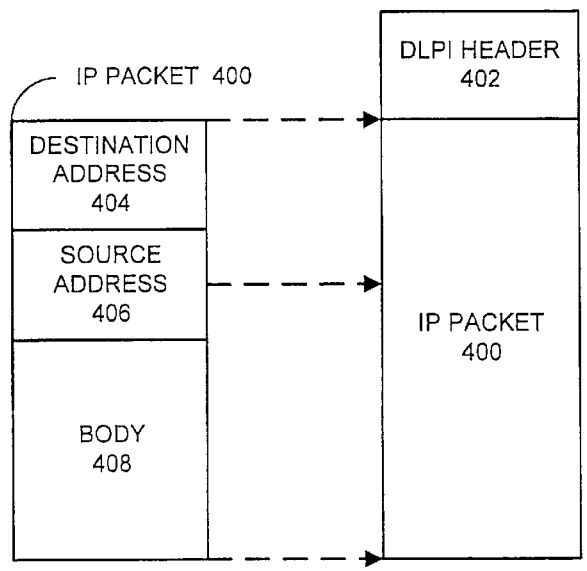
FIG. 4 illustrates how an IP packet is encapsulated with a DLPI header in accordance with an embodiment of the present invention.

FIG. 4 illustrates how an IP packet 400 is encapsulated with a DLPI header 402 in accordance with an embodiment of the present invention. In order for an IP packet 400 to be forwarded between interface node 103 and server node 104 (see FIG. 2), DLPI header 402 is attached to the head of IP packet 400. Note that DLPI header 402 includes the medium access control (MAC) address of the destination server node 104. Also note that IP packet 400 includes a destination address 404 that, in the preferred embodiment, specifies a protocol, a service IP address, and a service port number of a service that is hosted by interface node 103, as well as the source address 406 that, in the preferred embodiment, specifies a client IP address and client port number for a client that sent the packet.

Configuration Process

Figure 5A:
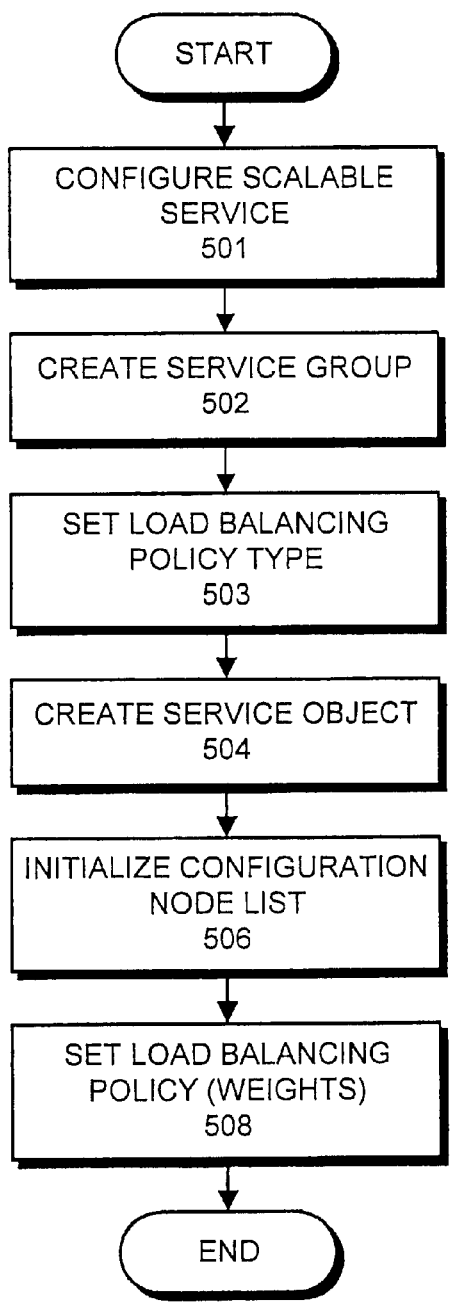
FIG. 5A is a flow chart illustrating the process of service registration in accordance with an embodiment of the present invention.

FIG. 5A is a flow chart illustrating the process of configuring a load balancing system in accordance with an embodiment of the present invention. The system starts by configuring a scalable service group (step 501). This involves creating a service group (step 502) for the scalable service group and specifying a load balancing policy type for the service group (step 503). In the preferred embodiment of the invention, there are at least three types of load balancing policies, which include 1) a non-affinity policy, 2) a client affinity policy, and 3) a wild card client affinity policy. There are various types of non-affinity policies, such as a weighted or round robin load balancing policy. In the preferred embodiment of the invention, load balancing policy weights are initially set at a default of equal weighting for each node. The weights may be set differently later at step 508. A service object is created for a particular service specified by a unique protocol, service IP address and port number (step 504) and is assigned to a service group. The service identified by the service object is placed in either a first service list hash table or a second service list hash table, which lists all services identified by all service objects in all service groups. Services that are identified by service objects in service groups, that do not have wild card client affinity load balancing policy, are placed in the first service list hash table. Services identified by service objects in service groups with a wild card client affinity load balancing policy type are place in the second service list hash table. In addition, services with the same IP service address as a non-scalable service should not be placed in a service group with wild card client affinity. Configuring a scalable service group also involves initializing a configuration node list 310 (step 506) to indicate which server nodes within clustered computing system 100 are able to provide the service group, and setting load balancing policy weights 306 for the service group to change the balance between the nodes from the default setting (step 508). Note that a particular load balancing policy can specify weights for the particular server nodes.

Figure 5B:
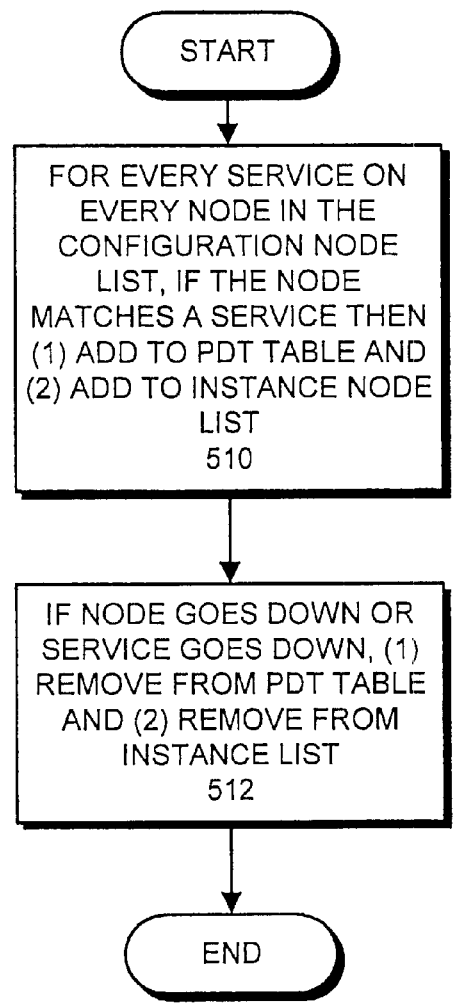
FIG. 5B is a flow chart illustrating the process of service activation/deactivation in accordance with an embodiment of the present invention.

FIG. 5B is a flow chart illustrating the process of service activation/deactivation in accordance with an embodiment of the present invention. This process happens whenever an instance is started or stopped, or whenever a node fails. For every scalable service group, the system examines every node on the configuration node list 310. If the node matches running version of the scalable service group, then the node is added to PDT 304 and to instance node list 312 (step 510).

If at some time in the future a node goes down or the service goes down, a corresponding entry is removed from PDT 304 and instance node list 312 (step 512).

Packet Processing

Figure 6:
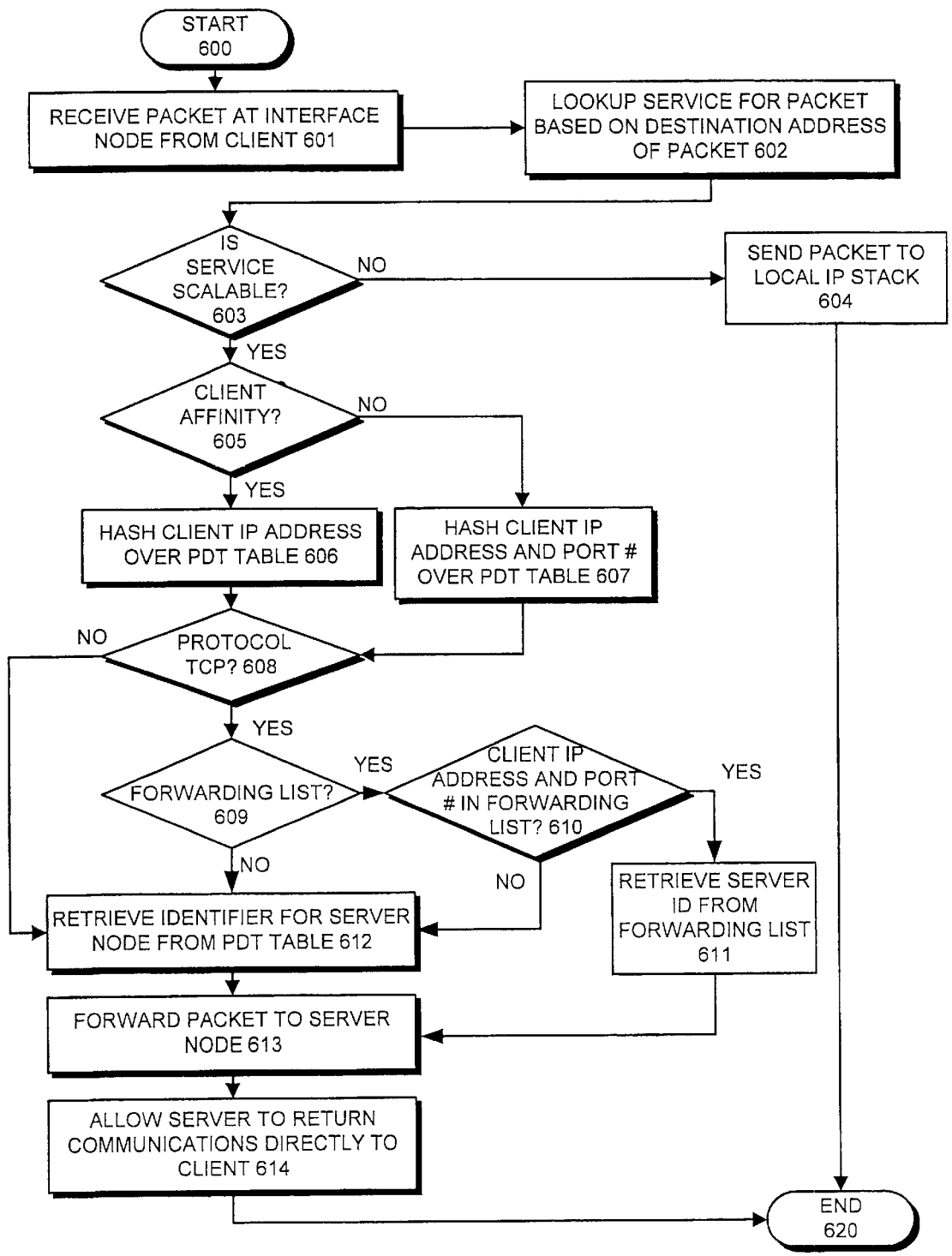
FIG. 6 is a flow chart illustrating how a packet is processed within an interface node in accordance with an embodiment of the present invention.

FIG. 6 is a flow chart illustrating how a packet is processed within an interface node in accordance with an embodiment of the present invention. The system starts by receiving IP packet 400 from client 121 at cluster networking multiplexer 218 within interface node 103 (step 601). IP packet 400 includes a destination address 404 specifying a service, and a client address 406 of the client that sent the packet.

The system first looks up a service for the packet based upon destination address, which in the preferred embodiment is the protocol, service IP address, and service port number, 404 (step 602). This lookup process is described in more detail with reference to FIG. 7 below.

The system next determines if the server is a scalable service (step 603), which is flagged in step 710 of FIG. 7, described in more detail below. If the service is not scalable, the system sends the packet to IP stack 215 within interface node/server node 103, so that server instance 202 can provide the non-scalable service (step 604). Alternatively, interface node 103 can send the packet to a default server node outside of interface node/server node 103 to provide the non-scalable service. For example, server node 104 can be appointed as a default node for non-scalable services. A scalable service is a service that may be served by one or more nodes in a cluster and as a load on the cluster demands. A non-scalable service is a service that is served on only one node.

If the service is a scalable service, the system determines to which server node to send the packet. In doing so, the system first determines whether the service group associated to the service of the packet has a load balancing policy type with client affinity (step 605), i.e., whether the load balancing policy type is client affinity or wild card client affinity. If so, the system hashes the client IP address over PDT 304 to select a bucket from PDT 304 (step 606). If not, the system hashes the client IP address and the port number to select a bucket from the PDT 304 (step 607). It should be noted that when the policy type is a client affinity policy, only the client address is hashed (as opposed to both the client address and port number). This is important in any systems where a single source may have multiple parallel connections with a server that needs to combine the information from the parallel connections (as for example while listening to an internet broadcast, one connection may be used to receive the broadcast and another connection may be used to control the broadcast.) When client affinity is not required, hashing both the client address and client port statistically tends to provide better load balancing.

Next, the system determines whether the protocol is TCP (step 608). If the protocol is not TCP (meaning it is UDP), the system retrieves an identifier for a server node from the entry in the selected bucket of the PDT(step 612). Otherwise, if the protocol is TCP, the system determines whether the selected bucket of the PDT 304 has a forwarding list (step 609). If the selected bucket does not have a forwarding list, the system retrieves the identifier for the server node from the entry in the selected bucket of the PDT 304 (step 612). If the selected bucket has a forwarding list, the system determines if the client IP address and port number are in a forwarding list (step 610). The forwarding list allows existing TCP connections to continue to go to the same node, when the PDT 304 is changed. If so, the system retrieves the server identifier from the forwarding list (step 611). Otherwise, the system retrieves the server identifier from the selected bucket in PDT 304 (step 612). In the preferred embodiment, where the forwarding list and a copy of the PDT is maintained in a service object, only the client IP address and client port of a listing in the forwarding list need to be compared with the client IP address and the client port of the packet to determine if there is a match, since the matching of the packet with the service object has already matched the service IP address and service port.

Next, the system forwards the packet to the server node indicated by the server identifier (step 613). This forwarding process is described in more detail below with reference to FIG. 8.

Interface node 103 then allows the selected server node to send return communications directly back to the client (step 614).

Process of Looking up a Service

Figure 7:
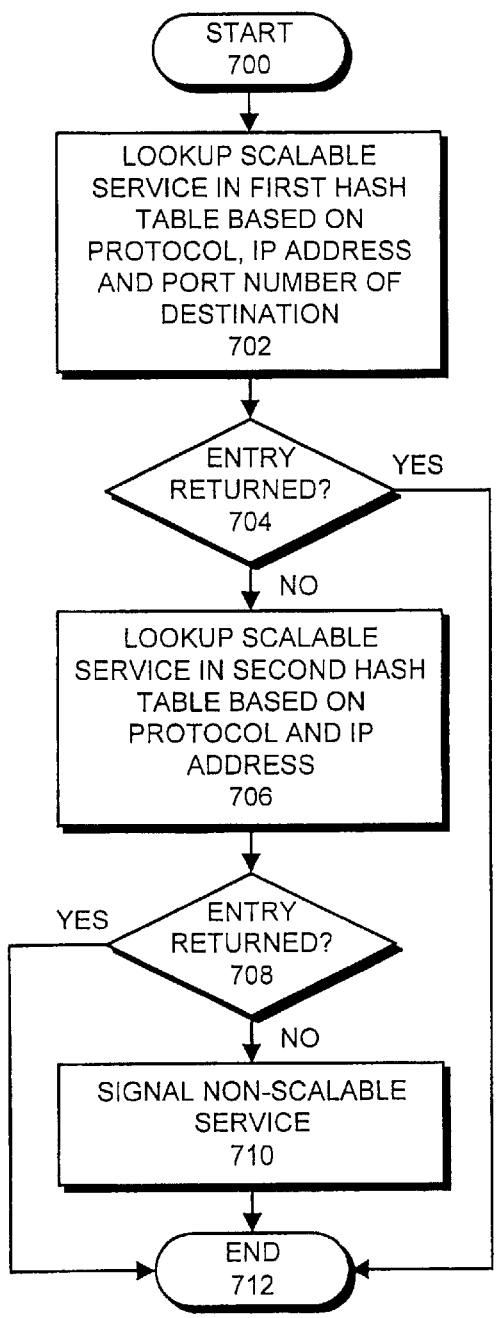
FIG. 7 is a flow chart illustrating the process of looking up a service for a packet in accordance with an embodiment of the present invention.

FIG. 7 is a flow chart illustrating the process of looking up a service for a packet in accordance with an embodiment of the present invention. The system starts by performing a look up based upon the destination address in a first hash table (step 702). In the described embodiment, the look up of the destination address in the first hash table is based on a hash of the protocol, service IP address, and port number of the service. If an entry is returned during this lookup, the associated service, service object, and service group is returned (step 704).

Otherwise, the system looks up a scalable service in a second hash table based upon the destination address (step 706). In this case, only the protocol and the IP address are used to perform the lookup. This is because the second lookup involves a scalable service with a "wild card client affinity" property. Wild card client affinity attempts to ensure that related services are performed on the same server node for the same client for all service ports including unregistered ports. Hence, the second hash table associates related services with the same IP address but with different port numbers with the same server node. This is useful if a node requests that the client "call back" at a dynamically assigned port. The process is complete and the associated service, service object, and service group are returned (step 708).

If no entry is returned in the second lookup, then the service is a non-scalable service and the system signals this fact (step 710), so that step 603 of FIG. 6 sends the packet to a local IP stack (step 604).

In one embodiment of the present invention, the first lookup selects services to be associated with non-affinity and client affinity load balancing policy types and the second lookup selects services to be associated with a wild card client affinity load balancing policy type, although other arrangements are within the scope of the invention.

Process of Forwarding a Packet

Figure 8:
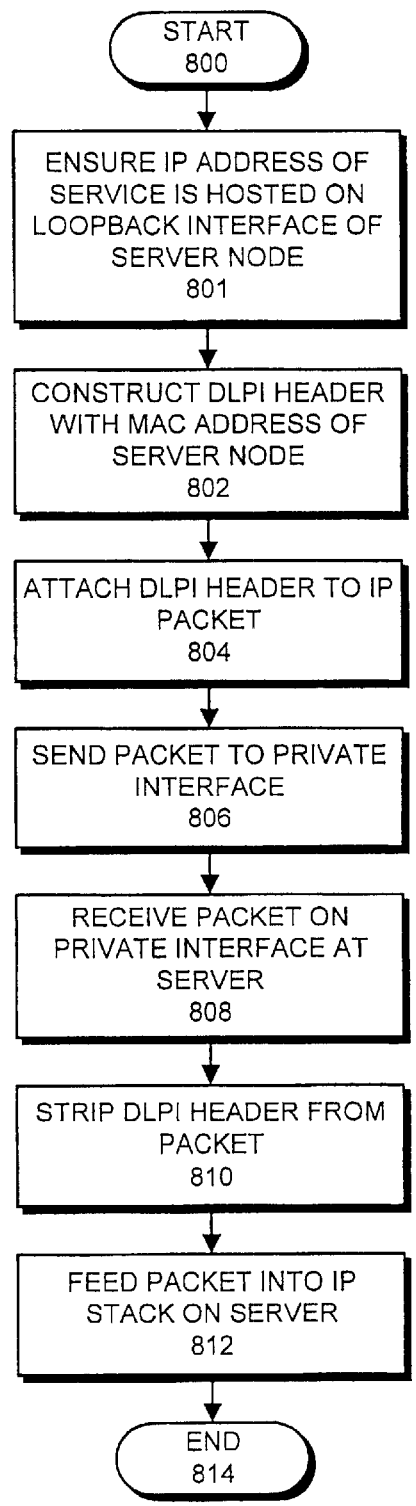
FIG. 8 is a flow chart illustrating the process of forwarding a packet to a server in accordance with an embodiment of the present invention.

FIG. 8 is a flow chart illustrating the process of forwarding a packet to a server in accordance with an embodiment of the present invention. At some time during an initialization process, the system ensures that the IP address of a service is hosted on the loopback interface of each server node that will be used to perform the service (step 801). This allows each server node to process packets for the service, in spite of the fact that the service is not hosted on a public interface of the server node. After an IP packet 400 is received and after a service and a server node are selected (in step 612 of FIG. 6), the system forwards IP packet 400 from cluster networking multiplexer 218 in interface node 103 to IP stack 216 within server node 104. This involves constructing a DLPI header 402, including the MAC address of server node 104 (step 802), and then attaching DLPI header 402 to IP packet 400 (see FIG. 4) (step 804).

Next, the system sends the IP packet 400 with DLPI header 402 to private interface 224 within interface node 103 (step 806). Private interface 224 sends IP packet 400 with DLPI header 402 to server node 104. Server node 104 receives the IP packet 400 with DLPI header 402 at private interface 226 (step 808). Next, a driver within server node 104 strips DLPI header 402 from IP packet 400 (step 810). IP packet 400 is then fed into the bottom of IP stack 216 on server node 104 (step 812). IP packet 400 subsequently passes through IP stack 216 on its way to server instance 203.

Note that the conventional means of using a remote procedure call (RPC) or an interface definition language (IDL) call to forward a packet from interface node 103 to server node 104 involves traversing an IP stack from an RPC/IDL endpoint to private interface 224 within interface node 103, and then traversing another IP stack again at server node 104 from private interface 226 to an RPC/IDL endpoint. This involves two IP stack traversals and is, hence, highly inefficient.

In contrast, the technique outlined in the flowchart of FIG. 8 eliminates the two IP stack traversals.

Also note that, in forwarding the packet to the server node, the system can load balance between multiple redundant paths between the interface node and the server node.

Forwarding List

Figure 10:
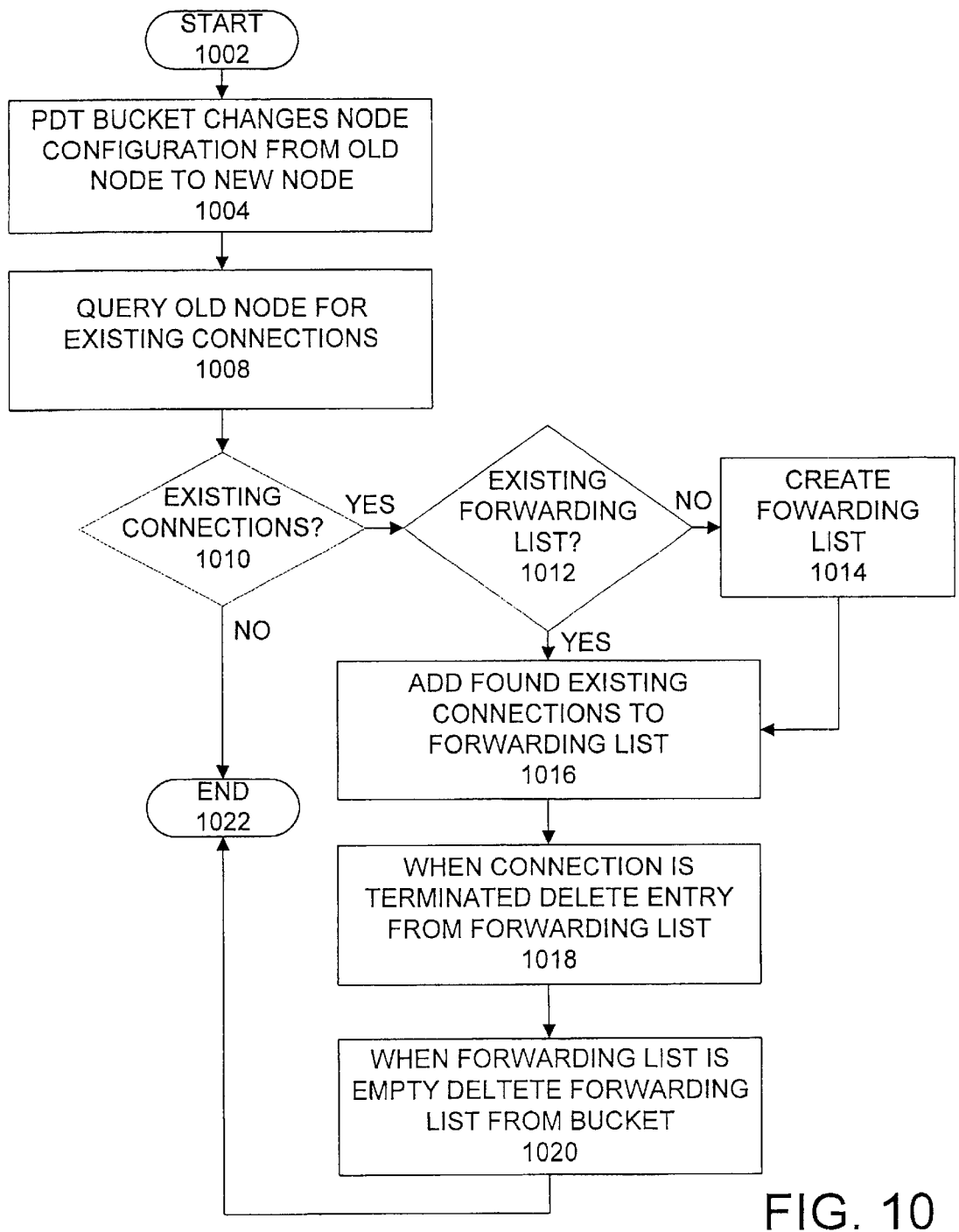
FIG. 10 is a flow chart illustrating the updating of a forwarding list in accordance with an embodiment of the present invention.

FIG. 10 illustrates a method of generating or updating a forwarding list when a server identifier of a bucket in a PDT is changed. Such changes may be made for various reasons. One reason for changing a server identifier is to change the load balancing for a PDT of a service group. An operator may change the load balancing between nodes as a way of tuning the system.

When a server identifier of a bucket of a PDT is changed, a server identifier for an old node is replaced with a server identifier of a new node (step 1004). The interface node 103 checks to see if the old node has any existing TCP connections (steps 1008 and 1010). If there are no existing TCP connections, the process is done (step 1022). If the old node has existing connections, a query is made to see if the bucket has a forwarding list (step 1012). If the bucket does not have a forwarding list, a forwarding list is created (step 1014). Both branches of step 1012 then add the existing TCP connections to the forwarding list (step 1016). In one embodiment, all existing TCP connections for packets with the same service IP address and service port as the PDT are added to the forwarding list. In another embodiment, only those TCP connections with the same service IP address and service port as the PDT and combination source IP address and source port that can be hashed into the bucket are added to the forwarding list, so that only connections corresponding to the bucket are added to the forwarding list. The advantage of placing all connections in the forwarding list is that it saves time required by hashing to see which source IP address and source port corresponds to the bucket. The advantage of only adding connections corresponding to the bucket to the forwarding list is that it keeps the forwarding list size to a minimum.

When an existing TCP connection is terminated, the old node sends a message indicating that the connection has been terminated, and the connection is deleted from the forwarding list (step 1018). When the forwarding list becomes empty the entry for the forwarding list may be removed from the bucket (step 1020).

The use of the forwarding list is described above in steps 608 to 613 of FIG. 6.

EXAMPLES

In the discussion below, an exemplary system is discussed in detail. It should be noted, however, that the parameters and process steps discussed below are illustrative only and are not limiting of the overall concept of the present invention. In the example below, a plurality of service groups is configured for the system shown in FIG. 1. A plurality of scalable service groups is configured according to step 501 of FIG. 5A. Since, in the examples below, either the master service groups or copies and other derivations of the service groups, such as slave or secondary service groups, may be used, the more generic term "service groups" will be used. In this example, service groups are created (Service Groups A–D) (step 502). For each service group, a load balancing policy type (step 503), a node configuration list (step 506), and node weights (step 508) are specified, as shown in Table 1.

TABLE 1

| Service Group | Load Balancing Policy Type | Node Configuration List |
| --- | --- | --- |
| A | Weighted | 103 (25%), 102 (75%) |
| B | Wild Card Client Affinity | 103 (50%), 102 (50%) |
| C | Client Affinity | 103 (75%), 102 (25%) |
| D | Client Affinity | 103 (25%), 102 (25%), 104 (50%) |

A plurality of service objects is created (step 504). In this example, five service objects (Service Objects 1–5 ) are created. Each service object defines a service within a service group, as shown in Table 2.

TABLE 2

| Service Object | Service | Service Group |
| --- | --- | --- |
| 1 | UDP, www.sun.com, 80 | A |
| 2 | TCP, www.east.sun.com, * | B |
| 3 | TCP, www.west.sun.com, 80 | C |
| 4 | TCP, www.south.sun.com, 443 | C |
| 5 | TCP, www.north.sun.com, 80 | D |

If all nodes are available for a four bucket PDT, the PDT for each service group may be as shown in Table 3 with service groups A, B, C, and D listed across the columns and buckets 1, 2, 3, and 4 listed across the rows. Four buckets are used in the example to provide a simple illustration. Even though four buckets are shown in this example, it should be appreciated that any number of buckets may be used and in most implementations the actual number of buckets is a much larger number and preferably a prime number.

TABLE 3

| | Service Group and Server Identifier Entry | | | |
| --- | --- | --- | --- | --- |
| Bucket Number | A | B | C | D |
| 1 | 103 | 103 | 103 | 103 |
| 2 | 102 | 103 | 103 | 102 |
| 3 | 102 | 102 | 103 | 104 |
| 4 | 102 | 102 | 102 | 104 |

Service object 2 has wild card client affinity, since it is associated with a service group, which has wild card client affinity. The services of the service objects 1 and 3–5 are placed in the first hash list and service object 2 is placed in the second hash list, since it has a wild card client affinity. In these examples there is no forwarding list for any of the buckets, so that step 610 is not used in these examples.

An Example of Weighted Load Balancing:

Using in this example typical IP protocol, an IP packet arrives at the interface node 103. The IP packet has a 5 tupple header in the form of {protocol, service IP address, service port, client IP address, client port}. The interface node uses the destination address of the packet (which in this example is the protocol, service IP address, and service port) and searches the services in the service list to see if the destination address matches any service. The search begins at the beginning of the first hash table (step 702) and if no match is found then proceeds to the second hash table (step 706), so that the services of service object 2, which is on the second hash table, are searched last, since it has wild card client affinity.

For example, a first packet may have the 5 tupple of {UDP, www.sun.com, 80, ibm.com, 84}. A lookup of the service list (step 602) finds that the service of service object 1 in the first hash table (step 702) matches the first packet. Since there is a match, the first packet uses a scalable service (step 603). Since the first packet matches service object 1, it is noted that service object 1 is associated with service group A, which has a weighted load balancing policy and the PDT as shown in Table 3. Since the load balancing policy type is weighted, there is no client affinity (step 605), therefore the client IP address and client port is hashed over the PDT (step 607). As will be appreciated by those skilled in the art, there are a wide variety of hashing algorithms that may be used to hash the client address and client port of the packet over the PDT. One way, which is used throughout this example, is by taking the modulus of the sum of the client address and the client port. In an example of one way of doing this, if "ibm.com" has an IP address hashed to 98,942, since there are only four buckets in PDT, then the divisor for the modulus is 4. Therefore, the bucket used is:

(IP client address+client port) Mod number of buckets=(98, 942+84) Mod4=2.

Therefore, the second bucket is chosen, which holds the service identifier for node 102 (step 612), since the protocol is UDP (step 608). The packet is forwarded to node 102 (step 613). Node 102 is able to directly send a packet back to the client (step 614).

Since UDP is connectionless, a new UDP packet may be assigned a new client port number. Since there is no client affinity for this service when a new UDP packet is sent at a different client port number, packets sent by the same client to the same destination and having the same service group may go to a different node. This is done by using the more randomly assigned client port number in the hashing of the PDT. The operator has given this service group a weighted load balancing policy since this service does not require client affinity. For example, if a second UDP packet is sent to the same service, the 5 tupple of the second packet would be {UDP, www.sun.com, 80, ibm.com, 79}. As discussed above, even though it is the same client sending a packet to the same service, the second packet may be sent over a different client port. A lookup of the service list (step 602) finds that the service of service object 1 in the first hash table (step 702) matches the second packet. Since there is a match, the second packet uses a scalable service (603). Since the second packet matches service object 1, it is noted that service object 1 is associated with service group A, which has a weighted load balancing policy and the PDT as shown in Table 3. Since the load balancing policy type is weighted, there is no client affinity (step 605), therefore the client IP address and client port is hashed over the PDT (step 607). Therefore, the bucket used is:

(IP client address+client port) Mod number of buckets (98,942+79) Mod 4=1. Therefore, the first bucket is chosen, which points to the service identifier for node 103 (step 612), since the protocol is UDP (step 608). The packet is kept in node 103 (step 613). Node 103 is able to directly send a packet back to the client (step 614). Therefore, even though the first and second packets have the same source address and destination address, and are in the same service group since they were sent from different client ports and the service group does not have a client affinity load balancing policy, the first and second packets may go to different nodes. The operator would chose this designation for services that do not need any kind of client affinity. The advantage of the weighted load balancing policy is that it more randomly distributes the packets, which provides a more even distribution of the work between nodes.

An Example of Single Service Client Affinity

A third packet during a third connection or session in this example may have a 5 tupple of {TCP, www.north.sun.com, 80, ibm.com, 84}. A lookup finds that the service of service object 5 in the first hash table (step 702) matches the third packet. Since there is a match, the third packet uses a scalable service (step 603). Since the third packet matches service object 5, it is noted that service object 5 is associated with service group D, which has a client affinity load balancing policy and the PDT as shown in Table 3 (step ). Since the load balancing policy type is client affinity, there is client affinity (step 605), therefore only the client IP address is hashed over the PDT (step 606). Therefore, the bucket used is:

(IP client address) Mod number of buckets=(98,942) Mod 4=2.

Therefore, the second bucket of the PDT of Table 3 is chosen, which points to the service identifier for node 102. Since the protocol is TCP (step 608) and there is no forwarding list associated with the second bucket (step 609), the packet is forwarded to node 102 (steps 612 and 613). Node 102 is able to directly send a packet back to the client (step 614).

As long as the TCP connection is maintained, the client continues to use the same client port number to send and receive TCP packets for that connection. An example of this would be if a user is browsing a web page. When the user sends data, a connection is established, the data is divided into packets, which are sent to the server during the connection. When the transmission is completed, the connection is closed. If the user does something else at the same web page, another connection is established.

A fourth packet during a fourth TCP connection in this example may have a 5 tupple of {TCP, www.north.sun.com, 80, ibm.com, 79}, which has the same protocol, service IP address, service port, and client IP address as the third packet, but has a different client port, because the fourth packet was send during a different connection. A lookup of the service list (step 602) finds that the service of service object 5 in the first hash table (step 702) matches the fourth packet. Since there is a match, the fourth packet uses a scalable service (step 603). Since the fourth packet matches service object 5, it is noted that service object 5 is associated with service group D, which has a client affinity load balancing policy and the PDT as shown in Table 3. Since the load balancing policy type is client affinity, there is client affinity (step 605), therefore only the client IP address is hashed over the PDT (step 606). Therefore, the bucket used is: (IP client address) Mod number of buckets=(98,942) Mod 4=2.

Therefore, the second bucket is chosen, which points to the service identifier for node 102. Since the protocol is TCP (step 608) and there is no forwarding list associated with the second bucket (step 609), the packet is forwarded to node 102 (steps 612 and 613). Node 102 is able to directly send a packet back to the client (step 614). Therefore, the third and fourth packets are sent to the same node. In fact, since the client port is not used in selecting the node, any packet with the same protocol, service IP address, service port, and client IP address as the third or fourth packet will be directed to the same node. This provides client affinity where all of the packets of different connections to the same service from the same client go to the same node.

Such client affinity is desirable when different connections from the client must be processed at a single node. One example would be the filling of forms that take several pages and connections.

In the example given, service object 5 is the only service object in service group D as can be seen in Table 2. Thus, no other service object has the same PDT as service object 5. Therefore, client affinity is kept only for this single service. This is called single service affinity.

An Example of Multi-Service Client Affinity

Sometimes, it is desirable to have client affinity over more than one service (multi-service client affinity). For example, it may be desirable that all connections to "www.west.sun.com, 80" and "www.south.sun.com, 443" from the same client be directed to the same node, where one connection may be a regular browsing connection and the other connection would be a secure credit card connection. Since service object 3 and service object 4 both are in service group C, which has client affinity, this would be an example of a multi-service client affinity.

A fifth packet during a fifth connection in this example may have a 5 tupple of {TCP, www.west.sun.com, 80, ibm.com, 84}. A lookup of the service list (step 602) finds that the service of service object 3 in the first hash table (step 702) matches the fifth packet. Since there is a match, the fifth packet uses a scalable service. Since the fifth packet matches service object 3, it is noted that service object 3 is associated with service group C, which has a client affinity load balancing policy and the PDT as shown in Table 3. Since the load balancing policy type is client affinity, there is client affinity (step 605). Therefore, only the client IP address is hashed over the PDT (step 606). Therefore, the bucket used is:

(IP client address) Mod number of buckets=(98,942) Mod 4=2.

Therefore, the second bucket is chosen, which points to the service identifier for node 103. Since the protocol is TCP (step 608) and there is no forwarding list associated with the second bucket (step 609), the fifth packet is kept at node 103 (steps 612 and 613). Node 103 is able to directly send a packet back to the client (step 614).

A sixth packet during a sixth connection in this example may have a 5 tupple of {TCP, www.south.sun.com, 443, ibm.com, 79}, which has the same client IP address as the fifth packet, but has a different service IP address, service port and client port. A lookup of the service list (step 602) finds that the service of service object 4 in the first hash table (step 702) matches the sixth packet. Since there is a match, the sixth packet uses a scalable service (step 603). Since the sixth packet matches service object 4, it is noted that service object 4 is associated with service group C, which has a client affinity load balancing policy and the PDT as shown in Table 3. Since the load balancing policy type is client affinity, there is client affinity (step 605). Therefore, only the client IP address is hashed over the PDT (step 606).

Therefore, the bucket used is:

(IP client address) Mod number of buckets=(98,942) Mod 4=2.

Therefore, the second bucket is chosen, which points to the service identifier for node 103. Since the protocol is TCP (step 608) and there is no forwarding list associated with the second bucket (step 609), the sixth packet is kept at node 103 (step 613). Node 103 is able to directly send a packet back to the client (step 614). Therefore, the fifth and sixth packets are sent to the same node. This provides client affinity where all of the packets of connections to one of two services from the same client address but different port numbers go to the same node.

An example of how this may be useful is during a web-based purchase using a secure port for credit card transactions. The browsing and the searching and selection of an item are done through an unsecured port (port 80) by the fifth connection. The sixth connection for the credit card transaction occurs over a secure port (port 443) possibly at a different service IP address. It may be desirable to have the node that handles the item selection also handle the credit card transaction. By placing more than one service object in the same service group all service objects in the service group are able to share client affinity between services.

It should be apparent that it is easy to add any number of service objects within a service group. Specifically, this can be done simply by identifying the same service group (e.g. Service Group C) for each of the service objects that are to share the same service group.

An Example of Wild Card Client Affinity

Sometimes service ports are dynamically created and it is desirable to have client affinity between all dynamically created ports for a particular service. In such a case, wild card client affinity provides such a service.

A seventh packet during a seventh connection in this example may have a 5 tupple of {TCP, www.east.sun.com, 80, ibm.com, 84}. A search is made of the first hash table (step 702) to find a match with the service of the seventh packet based on the protocol, IP address, and port number (step 702). No match is found (step 704), and so a search is made of the second hash table based only on protocol and IP address (step 706), where it is found that the service of service object 2 matches the seventh packet (step 708). Since there is a match, the seventh packet uses a scalable service. Since the seventh packet matches service object 2, it is noted that service object 2 is associated with service group B, which has a wild card client affinity load balancing policy and the PDT as shown in Table 3. Since the load balancing policy type is wild card client affinity, there is client affinity (step 605). Therefore, only the client IP address is hashed over the PDT (step 606). Therefore, the bucket used is:

(IP client address) Mod number of buckets=(98,942) Mod 4=2.

Therefore, the second bucket is chosen, which points to the service identifier for node 103. Since the protocol is TCP (step 608) and there is no forwarding list associated with the second bucket (step 609), the seventh packet is kept at node 103 (steps 612 and 613). Node 103 is able to directly send a packet back to the client (step 614).

Node 103 may find that port 80 is unavailable and request that the client send the next packet to a port that is available, for example port 901. Then an eighth connection is established and an eighth packet during the eighth connection in this example may have a 5 tupple of {TCP, www.east.sun.com, 901, ibm.com, 79}, which has the same protocol, service IP address, and client IP address as the seventh connection, but has a different service port and client port. A search is made of the first hash table (702) to find a match with the service of the eighth packet based on the protocol, IP address, and port number (step 702). No match is found (step 704), and so a search is made of the second hash table based only on protocol and IP address (step 706), where it is found that the service of service object 2 matches the eighth packet (step 602). Since there is a match, the eighth packet uses a scalable service (603). Since the eighth packet matches service object 2, it is noted that service object 2 is associated with service group B, which has a wild card client affinity load balancing policy and the PDT as shown in Table 3. Since the load balancing policy type is wild card client affinity, there is client affinity (step 605). Therefore, only the client IP address is hashed over the PDT (step 606). Therefore, the bucket used is:

(IP client address) Mod number of buckets=(98,942) Mod 4=2.

Therefore, the second bucket is chosen, which points to the service identifier for node 103. Since the protocol is TCP (step 608) and there is no forwarding list (step 609), the eighth packet is kept at node 103 (steps 612 and 613). Node 103 is able to directly send a packet back to the client (step 614). Therefore, the seventh and eighth packets are sent to the same node. In fact, since the client port is not used in selecting the node and the destination node is a wild card, any packet sent from a connection with the same protocol, IP address, and client IP address, as the seventh or eighth packet that is not associated with a service listed in the first hash table will be directed to the same node. This provides wild card client affinity. As stated above for wild card affinity, a non-scalable service should not have the same protocol and service IP address as a wild card affinity service and the service objects with a wild card client affinity are listed in the second hash table.

An Example of A Non-Scalable Service

A ninth packet during a ninth connection in this example may have a 5 tupple of {TCP, www.sun.com, 443, ibm.com, 84}. A lookup of the service list (step 602) is provided in detail in FIG. 7. A first hash table is searched comparing the protocol, IP address and port number of the service of the ninth packet with the services listed in the first hash table (step 702). No match is found (step 704), so a second hash table is searched comparing the protocol and IP address of the service of the ninth packet with the services listed in the second hash table (step 706). No match is found (step 708), so the service for the ninth packet is designated a non-scalable service (step 710). Since the service is found to be non-scalable (step 603), the ninth packet is processed either by node 103 or a node that is designated for serving non-scalable services (step 604). Such services are services that are only to be performed on a single node, which may be a specialized node dedicated for the non-scalable service. In the preferred embodiment of the invention, "TCP, www.sun.com, 443 " cannot be a non-scalable service if"TCP, www.sun.com" has wild card client affinity. The reason for this is that if "TCP, www.sun.com" is placed in the second hash table, "TCP, www.sun.com, 443 " will turn up as a match for "TCP, www.sun.com".

In the preferred embodiment, the source address comprises a client IP address and a client port number, where different client port numbers may be assigned for different connections or sessions, and the destination address comprises a service IP address and a service port number, where different service port numbers may be assigned for different connections to the same service IP address. In other embodiments, the IP addressing system may or may not be used. Therefore, more generally, the source address may comprise a first part, such as the client IP address which identifies the client address, and a second part, such as the client port number which may change during different sessions or connections. Similarly, the destination address may comprise a first part, such as the service IP address, which identifies the destination, and a second part, such as the service port. In other embodiments, the source address may be a single number or may have more than two parts. Similarly, the destination address may have a single number or may have more than two parts.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of distributing packets to server nodes in a cluster of nodes, comprising the steps of:
   receiving a packet that is directed to a selected service supported by the cluster wherein the selected service can be provided by a plurality of nodes in the cluster;
   determining an appropriate server node based at least in part on whether the service designates client affinity, wherein the packet includes a source address with a first part and a second part and a destination address, wherein the step of determining an appropriate server node comprises the steps of:
      determining if the packet matches a service object;
      if a service object matches the packet, checking a load balancing policy type of the service object matched with the packet to see if there is a client affinity;
      if the service object matched with the packet indicates no client affinity, performing a function which is dependent on the second part of the source address and that maps the first part of the source address and the second part of the source address to an entry in a packet distribution table associated with the service object matched with the packet, the packet distribution table including entries containing identifiers for server nodes in the cluster of nodes; and
      if the service object matched with the packet indicates client affinity, performing a function which is independent of the second part of the source address and that maps the first part of the source address to an entry in a packet distribution table associated with the service object matched to the packet, the packet distribution table including entries containing identifiers for server nodes in the cluster of nodes; and
   passing the received packet to the appropriate server node.

2. The method, as recited in claim 1, wherein the step of determining an appropriate server node further comprises the step of retrieving an identifier specifying a server node from the mapped entry in the packet distribution table, and wherein the step of passing the received packet comprises the step of forwarding the packet to the server node specified by the identifier so that the server node specified by the identifier can process the packet.

3. The method, as recited in claim 2, further comprising the step of associating at least two service objects with a packet distribution table, wherein the at least two service objects have a load balancing policy type with a client affinity.

4. The method, as recited in claim 3, further comprising the steps of, configuring a first hash table with a list of services associated with service objects, wherein the step of determining if the packet matches a service object, comprises the step of searching the first hash table to see if the packet matches a service listed in the first hash table.

5. The method, as recited in claim 4, wherein the services listed in the first hash table list the protocol and destination address of the services, and wherein the step of searching the first hash table searches the first hash table for matches between the protocol and destination address of the services with the protocol and destination address of the packet.

6. The method, as recited in claim 5, wherein the destination address comprises a first part and a second part, and wherein the destination address listed in the first hash table is the first part and second part of the destination address, and further comprising the steps of:
   configuring a second hash table with a list of services associated with service objects, wherein the services listed in the second hash table list the protocol and the first part of the destination address of the services, but not the second part of the destination address of the services, and wherein the step of determining if the packet matches a service object further comprises the step, if the packet does not match a service listed in the first hash table, searching the second hash table to see if a the protocol and first part of the destination address of the packet matches a protocol and first part of a destination address of a service listed in the second hash table.

7. The method as recited in claim 6, wherein if the packet does not match service listed in the second hash table:
   designating the packet as using a non-scalable service; and processing the packet at a server designated for handling non-scalable services.

8. The method as recited in claim 7, further comprising the steps of:
   creating at least one service group;
   setting a load balancing policy type for the service group;
   setting load balancing policy weights for the service group;
   initializing a node configuration list for the service group;
   creating a packet distribution table from the load balancing policy and node configuration list; and
   creating a service object associated with the service group.

9. The method, as recited in claim 8, further comprising the step of updating the packet distribution table, comprising the steps of:
   maintaining an instance node list in the service group;
   adding a node to the instance node list if the node is available to the service group; and
   redistributing entries in the packet distribution table according to the load balancing policy weights in view of the node added to the instance node list.

10. The method, as recited in claim 9, wherein the step of updating the packet distribution table, further comprises the steps of:
   deleting a node from the instance node list if the node becomes unavailable to the service group; and
   redistributing entries in the packet distribution table according to the load balancing policy weights in view of the node deleted from the instance node list.

11. The method, as recited in claim 10, wherein the first part of the source address is a client IP address and wherein the second part of the source address is a client port number and wherein the first part of the destination address is a service IP address and wherein the second part of the destination address is a service port number.

12. The method, as recited in claim 6, wherein the first part of the source address is a client IP address and wherein the second part of the source address is a client port number and wherein the first part of the destination address is a service IP address and wherein the second part of the destination address is a service port number.

13. The method, as recited in claim 1, wherein the first part of the source address is a client IP address and wherein the second part of the source address is a client port number.

14. A computer readable storage medium storing instructions that when executed by a computer cause the computer to perform a method of distributing packets to server nodes in a cluster of nodes that operate in concert, the method comprising the steps of:

receiving a packet that is directed to a selected service supported by the cluster wherein the selected service can be provided by a plurality of nodes in the cluster;

determining an appropriate server node based at least in part on whether the service designates client affinity, wherein the packet includes a source address with a first part and a second part and a destination address, wherein the step of determining an appropriate server node, comprises the steps of:

determining if the packet matches a service object;

if a service object matches the packet, checking a load balancing policy type of the service object matched with the packet to see if there is a client affinity;

if the service object matched with the packet indicates no client affinity, performing a function which is dependent on the second part of the source address and that maps the first part of the source address and the second part of the source address to an entry in a packet distribution table associated with the service object matched with the packet, the packet distribution table including entries containing identifiers for server nodes in the cluster of nodes;

if the service object matched with the packet indicates client affinity, performing a function which is independent of the second part of the source address and that maps the first part of the source address to an entry in a packet distribution table associated with the service object matched to the packet, the packet distribution table including entries containing identifiers for server nodes in the cluster of nodes; and retrieving an identifier specifying a server node from the mapped entry in the packet distribution table; and wherein the step of passing the received packet comprises the step of forwarding the packet to the server node specified by the identifier so that the server node specified by the identifier can process the packet; and passing the received packet to the appropriate server node.

15. The computer-readable storage medium, as recited in claim 14, wherein if no service object is matched with the packet, indicating that a service associated with the packet is non-scalable and wherein the method, further comprises the steps of:

associating at least two service objects with a packet distribution table, wherein the at least two service objects have a load balancing policy type with a client affinity;

configuring a first hash table with a list of services associated with service objects, wherein the step of determining if a packet matches a service object, comprises the step of searching the first hash table to see if the packet matches a service listed in the first hash table, wherein the services listed in the first hash table list the protocol and destination address of the services, and wherein the step of searching the first hash table searches the first hash table for matches between the protocol and destination address of the services with the protocol and destination address of the packet.

16. The computer-readable storage medium, as recited in claim 15, wherein the destination address comprises a first part and a second part, and wherein the destination address listed in the first hash table is the first part and second part of the destination address, the method further comprising the steps of:

creating at least one service group;

setting a load balancing policy type for the service group;

setting load balancing policy weights for the service group;

initializing a node configuration list for the service group;

creating a packet distribution table from the load balancing policy and node configuration list;

creating a service object associated with the service group;

wherein the step of determining if the packet matches a service object, further comprises the steps of:

configuring a second hash table with a list of services associated with service objects, wherein the services listed in the second hash table list the protocol and the first part of the destination address of the services, but not the second part of the destination address of the services; and if the packet does not match a service listed in the first hash table, searching the second hash table to see if a the protocol and first part of the destination address of the packet matches a protocol and first part of a destination address of a service listed in the second hash table, wherein if the packet does not match a service listed in the second hash table:

designating the packet as using a non-scalable service; and processing the packet at a server designated for handling non-scalable services.

17. An apparatus that forwards a packet between server nodes in a cluster of nodes, comprising:

a receiving mechanism within an interface node of the cluster of nodes that is configured to receive a packet that is directed to a selected service supported by the cluster of nodes, wherein the selected service can be provided by a plurality of nodes in the cluster;

a determining mechanism within the interface node that is configured to determine an appropriate server node based at least in part on whether the service designates client affinity, wherein the packet includes a source address with a first part and a second part and a destination address, wherein the determining mechanism, comprises:

a matching mechanism that is configured to determine if the packet matches a service object;

a checking mechanism that is configured to check a load balancing policy type of the service object matched with the packet to see if there is a client affinity, if a service object matches the packet;

a first mapping mechanism configured to perform a function which is dependent on the second part of the source address and that maps the first part of the source address and the second part of the source address to an entry in a packet distribution table associated with the service object matched with the packet, the packet distribution table including entries containing identifiers for server nodes in the cluster of nodes, if the service object matched with the packet indicates no client affinity;

a second mapping mechanism configured to perform a function which is independent of the second part of the source address and that maps the first part of the source address to an entry in a packet distribution table associated with the service object matched to the packet, the packet distribution table including entries containing identifiers for server nodes in the cluster of nodes, if the service object matched with the packet indicates client affinity; and a retrieving mechanism configured to retrieve an identifier specifying a server node from the mapped entry in the packet distribution table; and a passing mechanism within the interface node that is configured to pass the received packet to the appropriate server node.

18. The apparatus, as recited in claim 17, wherein the determining mechanism, further comprises:

a grouping mechanism that is configured to associate at least two service objects with a packet distribution table, wherein the at least two service objects have a load balancing policy type with a client affinity; and a first hash table configuring mechanism for configuring a first hash table with a list of services associated with service objects, wherein the matching mechanism comprises a first searching mechanism that is configured to search the first hash table to see if the packet matches a service listed in the first hash table, wherein the services listed in the first hash table list the protocol and destination address of the services, and wherein the first searching mechanism searches the first hash table for matches between the protocol and destination address of the services with the protocol and destination address of the packet.

19. The apparatus, as recited in claim 18, wherein the destination address comprises a first part and a second part, and wherein the destination address listed in the first hash table is the first part and second part of the destination address, wherein the determining mechanism further comprises a second hash table configuring mechanism for configuring a second hash table with a list of services associated with service objects, wherein the services listed in the second hash table list the protocol and the first part of the destination address of the services, but not the second part of the destination address of the services, wherein the matching mechanism further comprises a second searching mechanism that is configured to search the second hash table to see if a the protocol and first part of the destination address of the packet matches a protocol and first part of a destination address of a service listed in the second hash table.

20. The apparatus, as recited in claim 19, wherein the determining mechanism further comprises:

a service group creating mechanism that is configured to create at least one service group;

a policy type setting mechanism that is configured to set a load balancing policy type for the service group;

a policy weight setting mechanism that is configured to set load balancing policy weights for the service group;

a node configuration list initializing mechanism for configuring a node configuration list for the service group;

a packet distribution table creating mechanism configured to create a packet distribution table from the load balancing policy and node configuration list; and a service object creating mechanism that is configured to create a service object associated with the service group.

* * * * *